(12) United States Patent
Kojima et al.

(10) Patent No.: US 6,909,475 B2
(45) Date of Patent: Jun. 21, 2005

(54) DISPLAY UNIT AND PORTABLE TERMINAL UNIT

(75) Inventors: Kei Kojima, Hino (JP); Yutaka Nakamura, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 216 days.

(21) Appl. No.: 10/202,653

(22) Filed: Jul. 25, 2002

(65) Prior Publication Data

US 2003/0020679 A1 Jan. 30, 2003

(30) Foreign Application Priority Data

Jul. 27, 2001 (JP) .................................. 2001-228348

(51) Int. Cl.$^7$ ............................................ G02F 1/1333
(52) U.S. Cl. .......................... 349/58; 349/60; 361/681; 361/714; 361/752
(58) Field of Search ................... 349/58, 60; 361/681, 361/714, 752

(56) References Cited

U.S. PATENT DOCUMENTS

| | | | | |
|---|---|---|---|---|
| 5,929,950 A | * | 7/1999 | Matsuda | 349/60 |
| 6,064,453 A | * | 5/2000 | Inubushi et al. | 349/58 |
| 6,342,932 B1 | * | 1/2002 | Terao et al. | 349/58 |
| 2002/0015118 A1 | * | 2/2002 | Kashimoto | 349/58 |

* cited by examiner

*Primary Examiner*—Huyen Ngo
(74) *Attorney, Agent, or Firm*—Oblon, Spivak, McClelland, Maier & Neustadt, P.C.

(57) ABSTRACT

An LCD with elastic members attached to sides thereof is press-fitted between side walls provided on the left and right ends of an LCD holder, on which a backlight is mounted. Projections of the elastic members are engaged with recesses of the side walls, so that the LCD is held between the side walls.

22 Claims, 8 Drawing Sheets

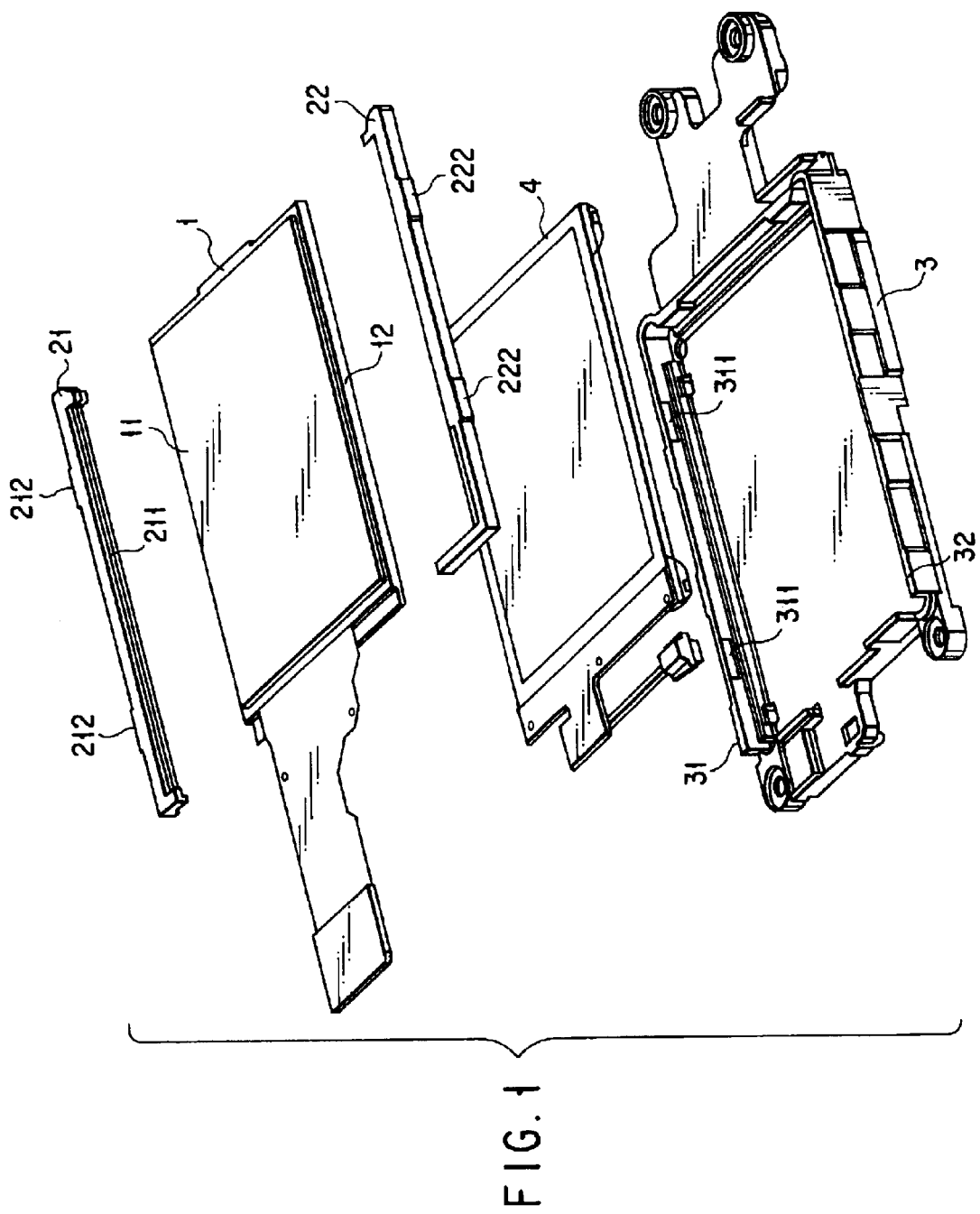

DISPLAY UNIT AND PORTABLE TERMINAL UNIT

CROSS-REFERENCE TO RELATED APPLICATIONS

This application is based upon and claims the benefit of priority from the prior Japanese Patent Application No. 2001-228348, filed Jul. 27, 2001, the entire contents of which are incorporated herein by reference.

BACKGROUND OF THE INVENTION

1. Field of the Invention

The present invention relates to a display unit of a mobile radio terminal unit for use in a mobile communication system, such as a cellular phone system, or a portable terminal unit, such as a PDA (Personal Digital Assistants).

2. Description of the Related Art

Recently, a mobile radio terminal unit for use in a mobile communication system such as a cellular phone system or a portable terminal unit such as a PDA is required to be compact and lightweight. On the other hand, an increase in size of the display thereof, including an LCD (Liquid Crystal Display), is pursued, so that more information can be transmitted to the user on one screen.

FIG. 8 shows a conventional display.

As shown in FIG. 8, a rear surface (non-display side) of an LCD 10 is adhered to a light emitting surface side of a backlight 40 by double-sided tapes 70. An LCD holder 30 holds the LCD 10 and the backlight 40. FIG. 9A is a cross-sectional view of these components. C91b in FIG. 9B is an enlarged view of a region C91a in FIG. 9A.

The conventional display unit having the aforementioned structure is disadvantageous in that the display unit is thickened due to the double-sided tapes 70. It is also disadvantageous in that the double-sided tapes 70 block off the light from the backlight 40. These disadvantages are the problems that must be solved in order to downsize the portable terminal unit or make the best use of the display region of the unit.

According to the conventional technique, the display unit may be disassembled because of failure of the adhesion of the double-sided tapes, or for the purpose of removing dust or repair. The disassembling process is time-consuming. Moreover, when the double-sided tapes are removed in the disassembling process, the LCD 10 or the backlight 40 may be damaged. Thus, there has been a demand for improvement of the display unit.

As described above, since the LCD and the backlight adhered by double-sided tapes are held in the LCD holder, the double-sided tapes restrict the display area and increase the thickness of the display unit. Further, the LCD or the backlight may be damaged during the process of removing the double-sided tapes to disassemble the display unit.

BRIEF SUMMARY OF THE INVENTION

The present invention has been made to solve the above problems, and an object is to provide a display unit which is thin, easy to disassemble and resistant to impact, and whose display area is not restricted.

To achieve the above object, according to an aspect of the present invention, there is provided a display unit comprising: holder having opposed wall surfaces; displaying part configured to display an image; and holding part, made of elastic material, configured to hold the displaying part between the opposed wall surfaces of the holder.

According to another aspect of the present invention, there is provided a portable terminal unit comprising a display unit which can visually display information, the display unit comprising: holder having opposed wall surfaces; displaying part configured to display an image; and holding part, made of elastic material, configured to hold the displaying part between the opposed wall surfaces of the holder.

In the display unit and the portable terminal unit having the above structures, the displaying means is held between the opposed wall surfaces of the holding means made of elastic material.

Thus, according to the display unit and the portable terminal unit having the above structures, the displaying means can be held within the holding means without using adhesive, such as double-sided tapes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing a structure of a display unit according to an embodiment of the present invention;

DETAILED DESCRIPTION OF THE INVENTION

A display unit according to embodiments of the present invention will be described with reference to the accompanying drawings.

FIG. 1 is a diagram showing a structure of a display unit according to an embodiment of the present invention. The display unit is to be mounted in a mobile radio terminal unit for use in a mobile communication system, such as a cellular phone system, or a portable terminal unit, such as a PDA. It is used as visually displaying means and display-controlled by a control section (not shown) mounted on the terminal unit.

As shown in FIG. 1, the display unit includes, as main components, an LCD 1, elastic members 21 and 22, an LCD holder 3 and a backlight 4.

The LCD 1 is a liquid crystal display whose surface is covered by glass or plastic. It visually outputs various information, such as letters and images, under the display control of the control section. The LCD transmits light emitted from the backlight 4 (to be described later) and applied thereto from behind.

Figure 2A:
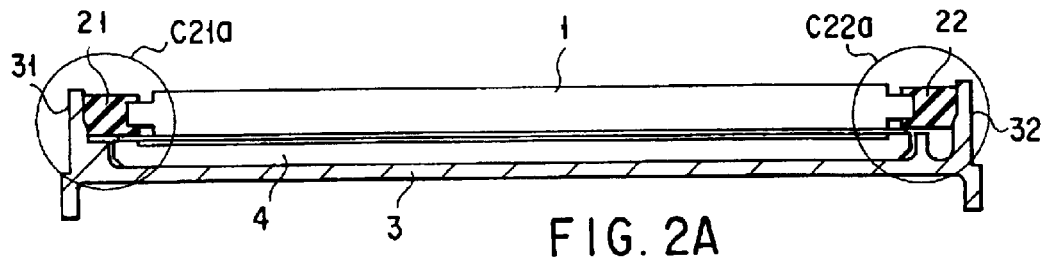
FIGS. 2A to 2C are diagrams showing a cross-sectional view of the display unit and cross-sectional enlarged views of engagement portions.
Figure 2B:
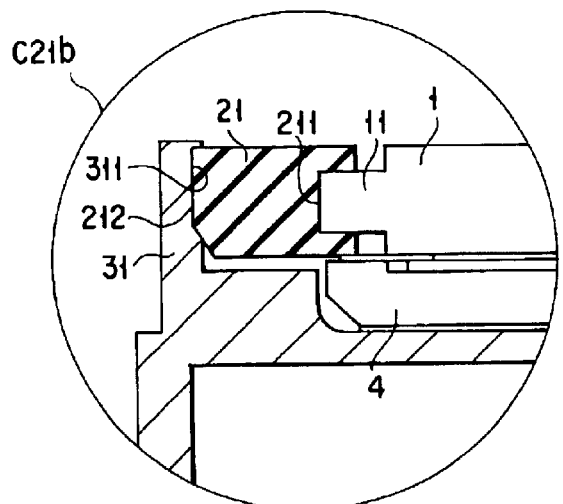
Figure 2C:
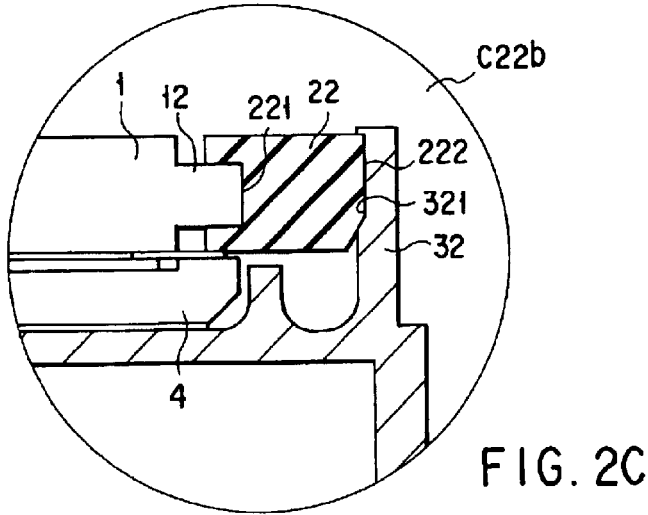

The elastic member 21 is made of rubber or like elastic material. It is attached to a left side of the LCD 1. FIGS. 2A to 2C show how it is attached to the LCD 1. C21b in FIG. 2B is an enlarged view of a region C21a in FIG. 2A. C22b in FIG. 2C is an enlarged view of a region C22a in FIG. 2A.

As shown in FIG. 2B, the elastic member 21 is equal to or thinner than the LCD 1. It has a recess 211 to be engaged with a projection 11 on the left side of the LCD 1.

The elastic member 21 has, on the opposite side from the recess 211, a projection 212 to be engaged with an LCD holder 3 described later.

The elastic member 22, as well as the elastic member 21, is made of rubber or like elastic material and attached to a right side of the LCD 1. As shown in FIG. 2C, the elastic member 22 is equal to or thinner than the LCD 1. It has a recess 221 to be engaged with a projection 12 on the right side of the LCD 1.

The elastic member 22 has, on the opposite side from the recess 221, a projection 222 to be engaged with the LCD holder 3 described later.

The LCD holder 3 is a chassis, which is, for example, formed of aluminum by means of die casting. It has a side wall 31 on its left end and a side wall 32 on its right end.

As shown in FIG. 2B, the side wall 31 has a recess 311 to be engaged with the projection 212 of the LCD 1. Likewise, as shown in FIG. 2C, the side wall 32 has a recess 321 to be engaged with the projection 222 of the LCD 1.

The backlight 4 arranged behind the LCD 1 has a thin-plate light emitting body using fluorescent tubes or the like. The light emission thereof is controlled by the aforementioned control section.

An example of a procedure for assembling the above display unit will be described with reference to FIGS. 3A to 3F.

Figure 3A:
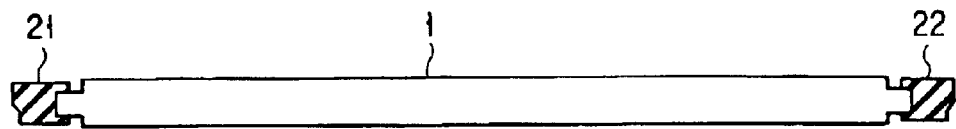
FIGS. 3A to 3F are diagrams showing steps for assembling the display unit shown in FIG. 1.

First, as shown in FIG. 3A, the elastic member 21 is attached to the left side of the LCD 1, and the elastic member 22 is attached to the right side thereof.

Figure 3B:

Then, as shown in FIG. 3B, the elastic members 21 and 22 attached to the LCD 1 are pressurized and moderately deformed.

Figure 3C:

Thereafter, as shown in FIG. 3C, the backlight 4 is mounted on the LCD holder 3 with the light-emitting surface facing upward. Further, the LCD 1 is put on the backlight 4 with a pressure applied to the elastic members 21 and 22, and then, the pressure is released.

Figure 3D:
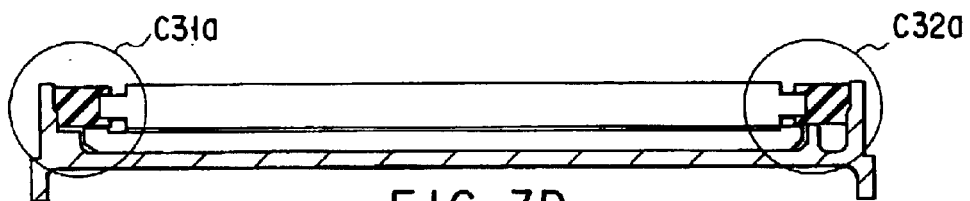

When the pressure is released, the elastic members 21 and 22 are restored to the original state, as shown in FIG. 3D. As a result, the projection 212 of the elastic member 21 engages with the recess 311 of the LCD holder 3, and the projection 222 of the elastic member 22 engages with the recess 321 of the holder 3.

Thus, the LCD 1 is fixed by means of the elastic members 21 and 22 to inner sides of the LCD holder 3 on which the backlight 4 is placed.

Figure 3E:
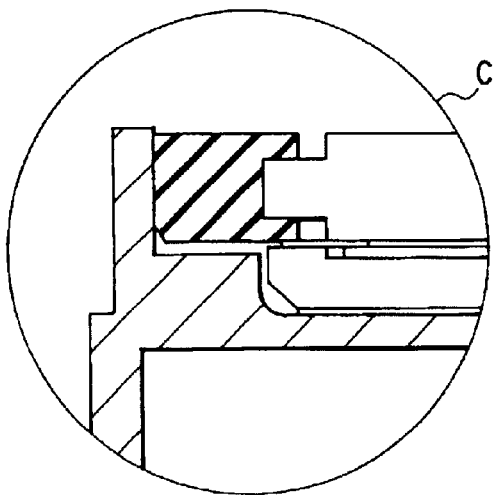
Figure 3F:
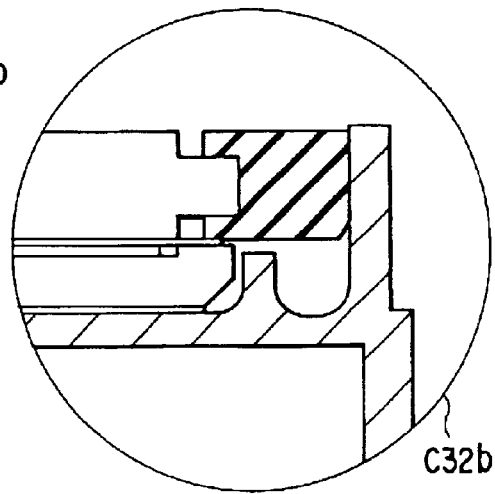

C31b in FIG. 3E is an enlarged view of a region C31a in FIG. 3D. C32b in FIG. 3F is an enlarged view of a region C32a in FIG. 3D.

As described above, according to the display unit of this embodiment, the LCD 1 with the elastic members 21 and 22 attached to the sides thereof is press-fitted between the side walls 31 and 32 provided on the left and right ends of the LCD holder 3, on which the backlight 4 is mounted. The projections 212 and 222 of the restorable elastic members 21 and 22 are engaged with the recesses 311 and 321 of the side walls 31 and 32, so that the LCD 1 is held between the side walls 31 and 32.

Therefore, the display unit of the above structure does not need adhesive, such as a double-sided tape, to hold the LCD 1 within the LCD holder 3. Thus, there is no adhesive that increases the thickness of the display unit and restricts the display area. In addition, even if dust or foreign matter is caught between the LCD 1 and the backlight 4, it can be removed easily by a simple decomposition process.

Moreover, since the LCD 1 is held by means of the elastic members 21 and 22 within the LCD holder 3 formed of a rigid aluminum die cast, it is resistant to impact. Therefore, even if the display unit is dropped, the possibility of damage is remarkably reduced.

The present invention is not limited to the above embodiment.

In the above embodiment, the LCD 1 with the elastic members 21 and 22 attached to the sides thereof is press-fitted in the LCD holder 3, and the elastic members 21 and 22 are restored to the original state when the pressure is released. Instead, the elastic members 21 and 22 may not be restored completely to the original state while they are holding the LCD 1, if the distance between the side walls 31 and 32 is set slightly shorter than that in the above embodiment.

If the LCD 1 is held in this manner, it is held more stably between the side walls 31 and 32 of the LCD holder 3 owing to the restoring force of the elastic members 21 and 22.

In this case, where the elastic members 21 and 22 are not completely restored within the LCD holder 3, the thickness of the elastic members 21 and 22 must be determined so as not to exceed the thickness of the LCD 1 when they are deformed.

The backlight 4 may be adhered to the LCD holder 3 by double-sided tape or the like.

Figure 4:
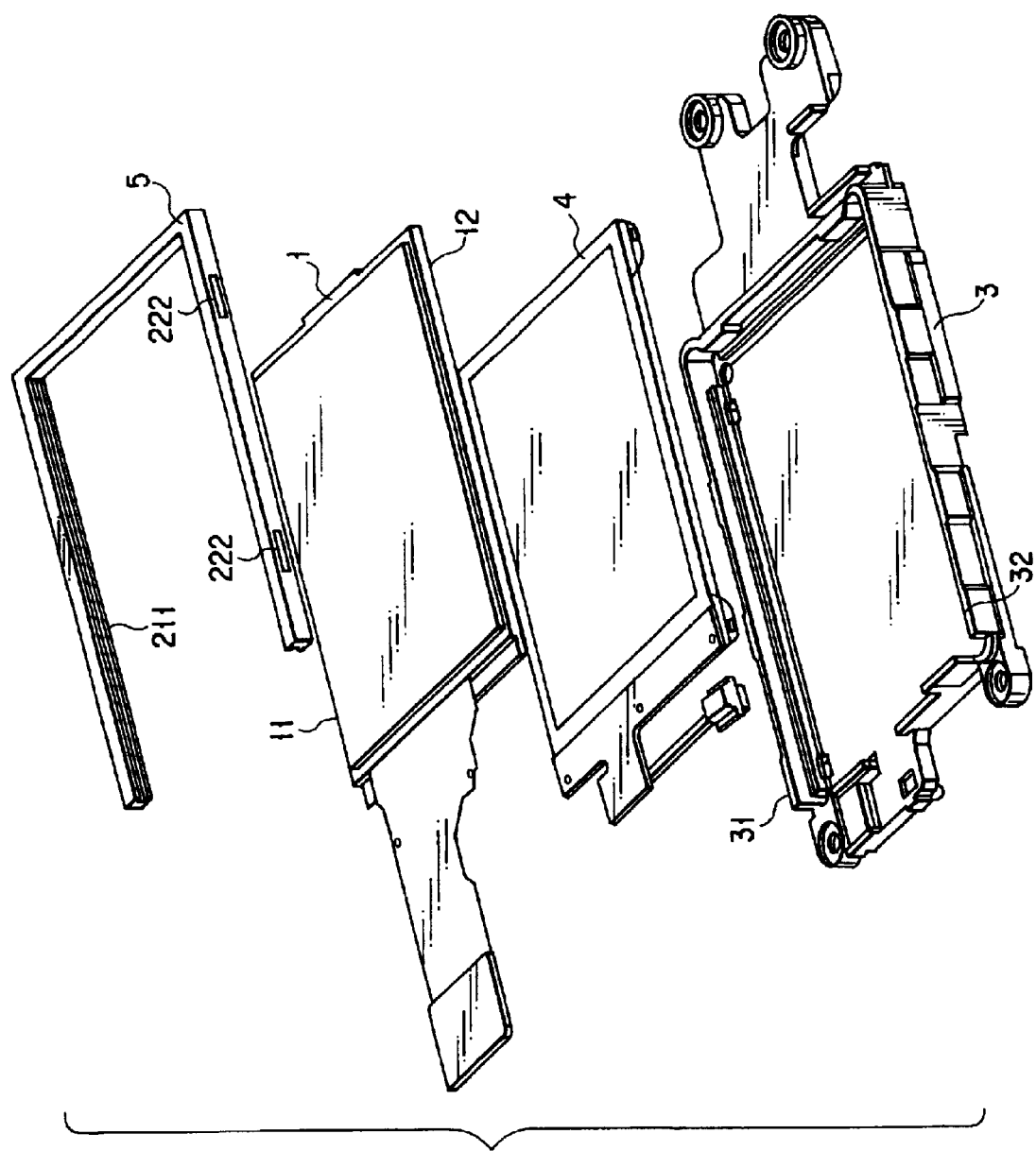
FIG. 4 is a diagram showing a structure of a display unit according to a modification of the present invention.

Further, in the above embodiment, the elastic members 21 and 22 are attached to the left and right of the LCD 1 so that the LCD holder 3 holds the left and right sides of the LCD 1. Instead, as shown in FIG. 4, a U-shaped elastic member 5 may be used to provide an elastic member on the upper side across the left and right sides of the LCD 1, thereby holding the LCD 1 by the three wall surfaces of the LCD holder 3.

Thus, the elastic members may be provided on at least two opposed sides to hold the LCD 1 within the LCD holder 3. Besides the above embodiment and the modifications, the LCD 1 may be surrounded by a rectangular elastic member, thereby holding the LCD 1 by the four wall surfaces of the LCD holder 3. Alternatively, four elastic members may be provided at four corners of the LCD 1, so that the LCD 1 can be held at four corners of the LCD holder 3.

Figure 5A:
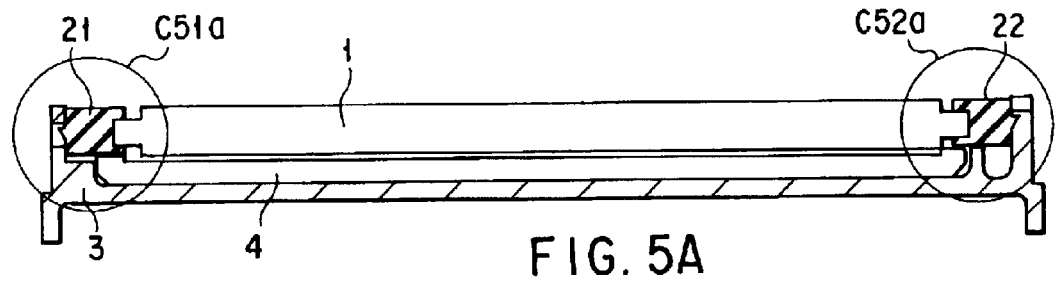
FIGS. 5A to 5C are diagrams showing a cross-sectional view of the display unit and cross-sectional enlarged views of engagement portions according to another modification of the present invention.
Figure 5B:
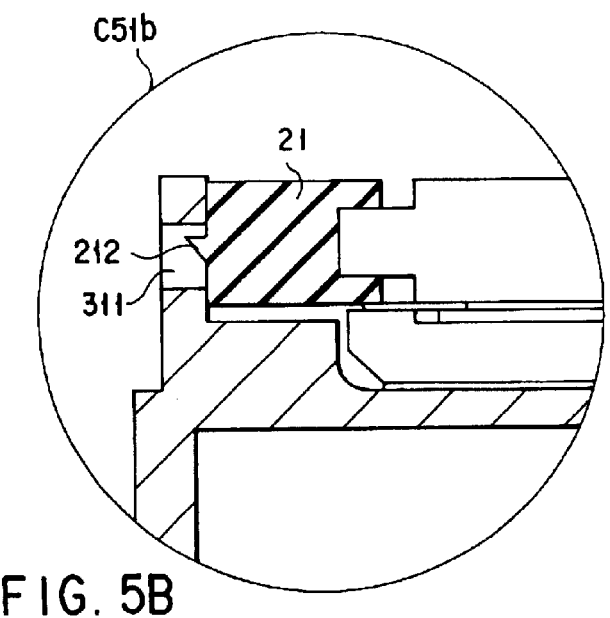
Figure 5C:
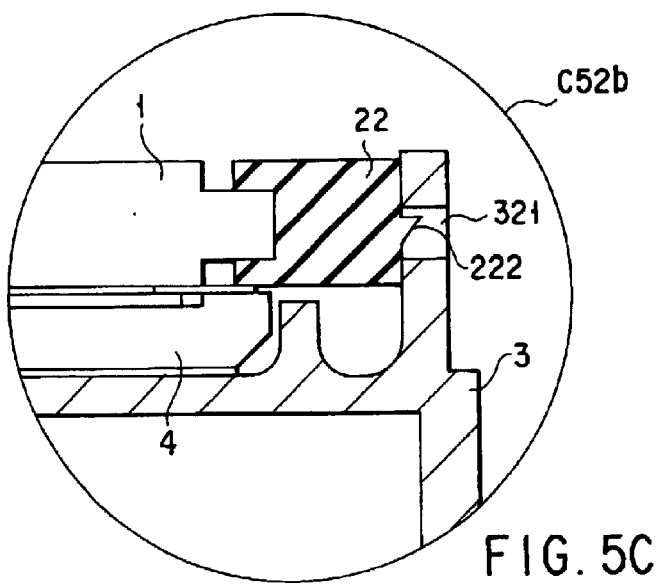

Furthermore, the projections 212 and 222 of the elastic members 21 and 22, which are to be engaged with the recesses 311 and 321 of the LCD holder 3, may be wedge-shaped as shown in FIGS. 5A to 5C. In this case, the LCD 1 with the elastic members 21 and 22 attached to the sides thereof can be press-fitted in the LCD holder 3 more easily.

Still further, the recesses 311 and 321 may be through holes, as shown in FIGS. 5A to 5C. C51b in FIG. 5B is an enlarged view of a region C51a in FIG. 5A. C52b in FIG. 5C is an enlarged view of a region C52a in FIG. 5A.

Figure 6:
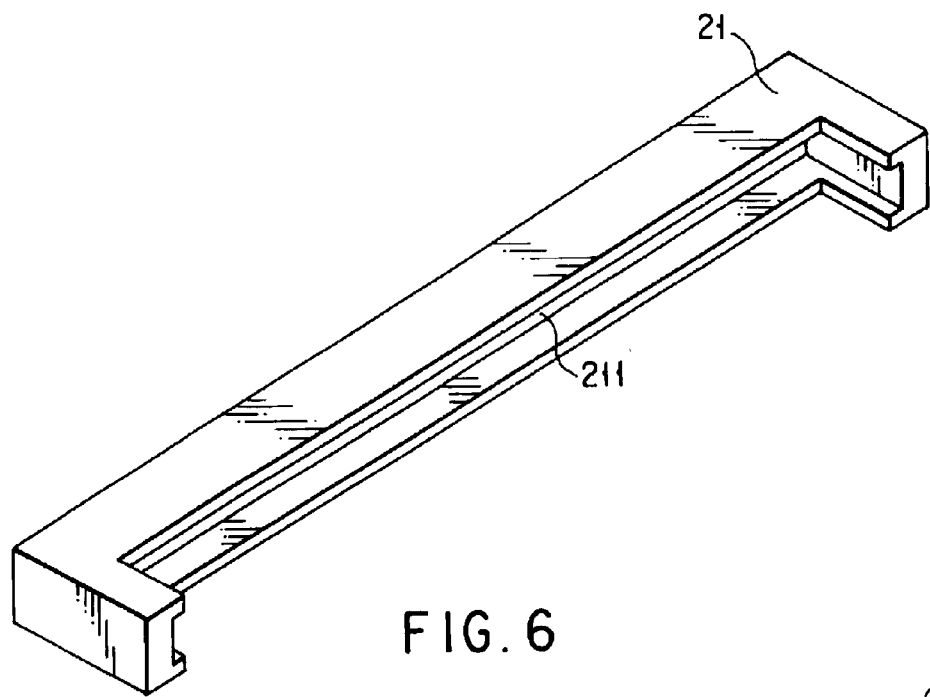
FIG. 6 is a diagram showing the elastic member shown in FIG. 1.
Figure 7:
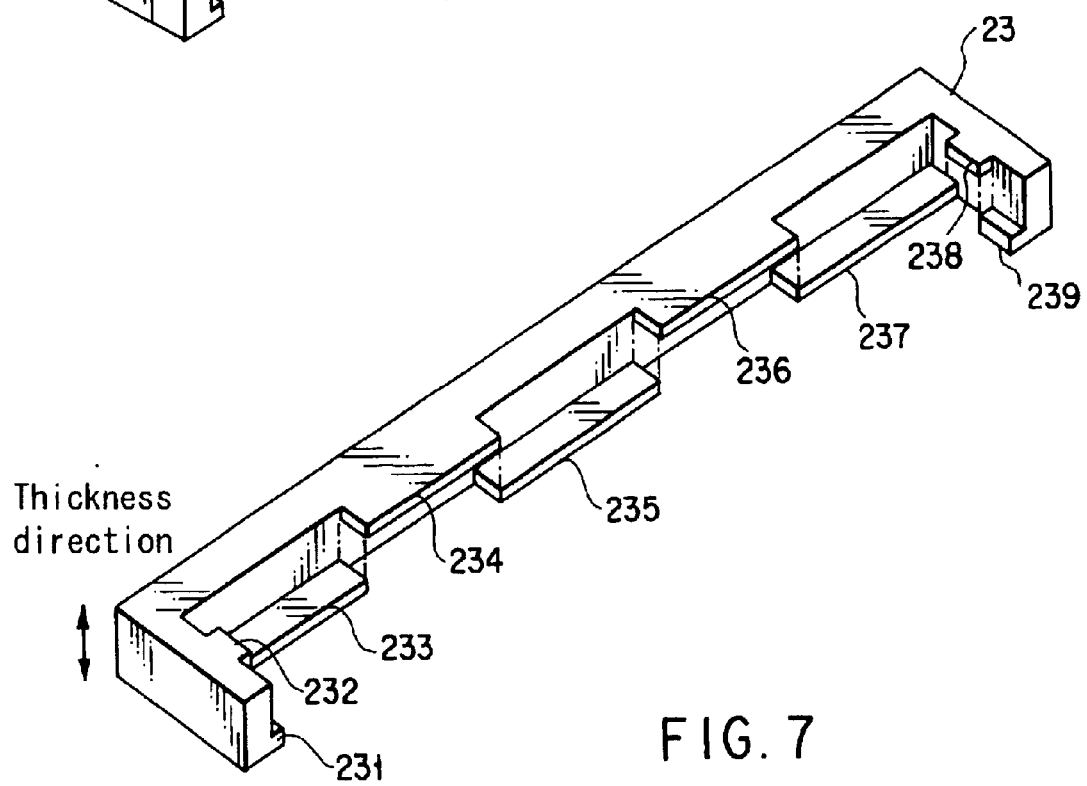
FIG. 7 is a diagram showing a modification of the elastic member shown in FIG. 1.
Figure 8:
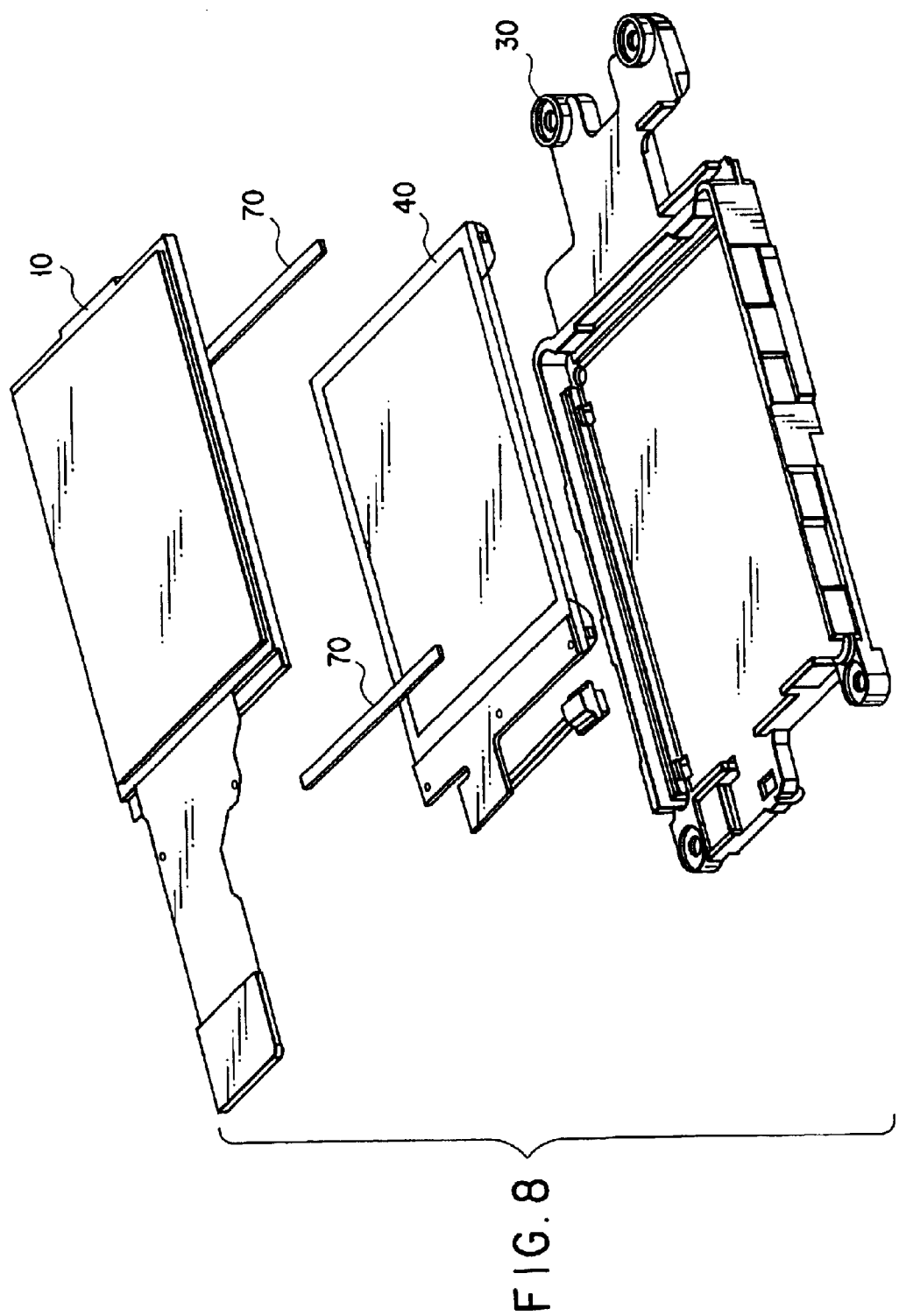
FIG. 8 is a diagram showing a structure of a conventional display unit.
Figure 9A:
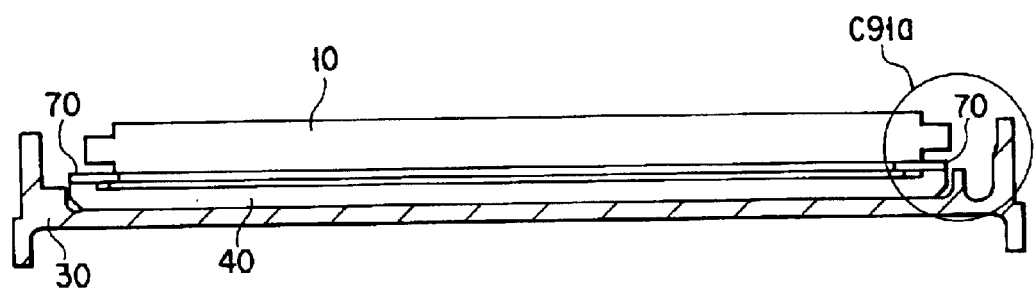
FIGS. 9A and 9B are diagrams showing a cross-sectional view of the conventional display unit shown in FIG. 8 and a cross-sectional enlarged view of an adhered portion thereof.
Figure 9B:
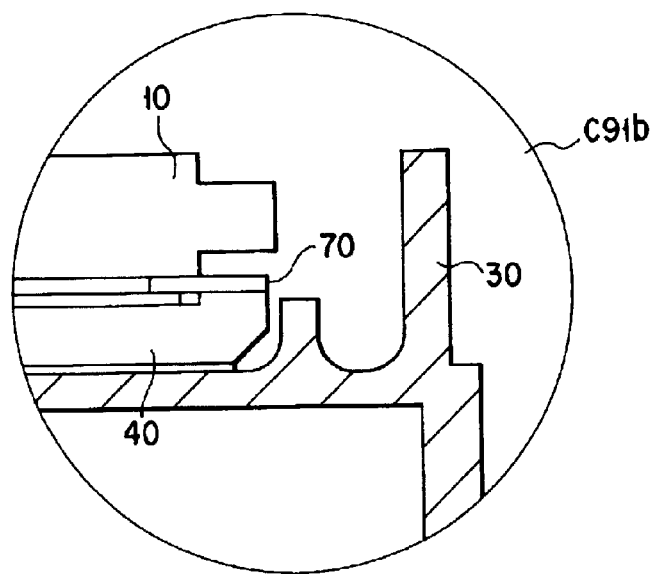

Further, in the above embodiment, as shown in FIG. 6, the elastic member 21 has the recess 211 which is to be engaged with the projection 11 of the LCD 1. Instead of this elastic member 21, for example, an elastic member 23 as shown in FIG. 7 may be used.

The elastic member 23 has projections 231 to 239 on the side to be fit to the projection 11 of the LCD 1. The projection 232 does not overlap the projections 231 and 233 at all when viewed in a thickness direction of the LCD 1.

Likewise, when viewed in the thickness direction of the LCD 1, the projection 234 does not overlap the projections 233 and 235, the projection 236 does not overlap the projections 235 and 237, and the projection 238 does not overlap the projections 237 and 239.

With the elastic member 21 of this structure, the projection 11 of the LCD 1 can be held between a series of projections 231, 233, 235, 237 and 239 and a series of projections 232, 234, 236, 238.

Moreover, the elastic member 23 with the above structure can be easily formed by means of a mold. Naturally, the structure of the elastic member 23 may be applied to the elastic member 22 to be attached to the right side of the LCD 1.

The present invention may be further modified without departing from the scope of the gist of the invention, in which case the same advantages as those of the above embodiment can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display unit comprising:
   holder having opposed wall surfaces;
   displaying part configured to display an image; and
   holding part, made of elastic material, configured to hold the displaying part in a clamped state between the opposed wall surfaces of the holder and be disposed on the holder.

2. A display unit comprising:
   holder having opposed wall surfaces;
   lighting part, disposed between the wall surfaces of the holder, configured to light;
   displaying part configured to display an image; and
   holding part, made of elastic material, configured to hold the displaying part in a clamped state between the opposed wall surfaces of the holder and be disposed on the holder or the lighting part.

3. The display unit according to claim 1 or 2, wherein the holding part is provided on at least two sides of the displaying part and holds the displaying part in a clamped state between the opposed wall surfaces of the holder.

4. The display unit according to claim 1 or 2, wherein the holding part has a first engaging portion to be engaged with a side surface of the displaying part and a second engaging portion to be engaged with a wall surface of the holder, and holds the displaying part in a clamped state between the opposed wall surfaces of the holder.

5. The display unit according to claim 4, wherein the first engaging portion of the holding part to be engaged with the displaying part has at least two projections to hold the displaying part in a clamped state, said at least two projections being arranged so as not to overlap at all when viewed in a thickness direction of the displaying part.

6. The display unit according to claim 4, wherein the second engaging portion of the holding part to be engaged with the wall surface is wedge-shaped.

7. The holding unit according to claim 1 or 2, wherein the holder holds a projection, which is provided on the displaying part, in a clamped state.

8. A portable terminal unit comprising a display unit which can visually display information, said display unit comprising:
   holder having opposed wall surfaces;
   lighting part, disposed between the wall surfaces of the holder, configured to light;
   displaying part configured to display an image; and
   holding part, made of elastic material, configured to hold the displaying part in a clamped state between the opposed wall surfaces of the holder and be disposed on the holder or the lighting part.

9. A portable terminal unit comprising a display unit which can visually display information, said display unit comprising:
   holder having opposed wall surfaces;
   displaying part configured to display an image; and
   holding part, made of elastic material, configured to hold the displaying part in a clamped state between the opposed wall surfaces of the holder and be disposed on the holder.

10. The portable terminal unit according to claim 9 or 8, wherein the holding part is provided on at least two sides of the displaying part and holds the displaying part in a clamped state between the opposed wall surfaces of the holder.

11. The portable terminal unit according to claim 9 or 8, wherein the holding part has a first engaging portion to be engaged with a side surface of the displaying part and a second engaging portion to be engaged with a wall surface of the holder, and holds the displaying part in a clamped state between the opposed wall surfaces of the holder.

12. The portable terminal unit according to claim 11, wherein the first engaging portion of the holding part to be engaged with the displaying part has at least two projections to hold the displaying part in a clamped state, said at least two projections being arranged so as not to overlap at all when viewed in a thickness direction of the displaying part.

13. The portable terminal unit according to claim 11, wherein the second engaging portion of the holding part to be engaged with the wall surface is wedge-shaped.

14. The portable terminal unit according to claim 9 or 8, wherein the holder holds a projection, which is provided on the displaying part, in a clamped state.

15. A display unit comprising:
   holder having opposed wall surfaces;
   displaying part configured to display an image; and
   holding part, made of elastic material, configured to hold the displaying part in a clamped state between the opposed wall surfaces of the holder, wherein the holding part has a first engaging portion to be engaged with a side surface of the displaying part and a second engaging portion to be engaged with a wall surface of the holder, and holds the displaying part in a clamped state between the opposed wall surfaces of the holder, and the first engaging portion of the holding part to be engaged with the displaying part has at least two projections to hold the displaying part in a clamped state, and said at least two projections are arranged so as not to overlap at all when viewed in a thickness direction of the displaying part.

16. A display unit comprising:

holder having opposed wall surfaces;

displaying part configured to display an image; and holding part, made of elastic material, configured to hold the displaying part in a clamped state between the opposed wall surfaces of the holder, wherein the holding part has a first engaging portion to be engaged with a side surface of the displaying part and a second engaging portion to be engaged with a wall surface of the holder, and holds the displaying part in a clamped state between the opposed wall surfaces of the holder, and the second engaging portion of the holding part to be engaged with the wall surface is wedge-shaped.

17. A display unit comprising:

holder having opposed wall surfaces;

lighting part, disposed between the wall surfaces of the holder, configured to light;

displaying part configured to display an image; and holding part, made of elastic material, configured to hold the displaying part in a clamped state between the opposed wall surfaces of the holder, wherein the holding part has a first engaging portion to be engaged with a side surface of the displaying part and a second engaging portion to be engaged with a wall surface of the holder, and holds the displaying part in a clamped state between the opposed wall surfaces of the holder, and the first engaging portion of the holding part to be engaged with the displaying part has at least two projections to hold the displaying part in a clamped state, and said at least two projections are arranged so as not to overlap at all when viewed in a thickness direction of the displaying part.

18. A display unit comprising:

holder having opposed wall surfaces;

lighting part, disposed between the wall surfaces of the holder, configured to light;

displaying part configured to display an image; and holding part, made of elastic material, configured to hold the displaying part in a clamped state between the opposed wall surfaces of the holder, wherein the holding part has a first engaging portion to be engaged with a side surface of the displaying part and a second engaging portion to be engaged with a wall surface of the holder, and holds the displaying part in a clamped state between the opposed wall surfaces of the holder, and the second engaging portion of the holding part to be engaged with the wall surface is wedge-shaped.

19. A portable terminal unit comprising a display unit which can visually display information, said display unit comprising:

holder having opposed wall surfaces;

displaying part configured to display an image; and holding part, made of elastic material, configured to hold the displaying part in a clamped state between the opposed wall surfaces of the holder and be disposed on the holder, wherein the holding part has a first engaging portion to be engaged with a side surface of the displaying part and a second engaging portion to be engaged with a wall surface of the holder, and holds the displaying part in a clamped state between the opposed wall surfaces of the holder, and the first engaging portion of the holding part to be engaged with the displaying part has at least two projections to hold the displaying part in a clamped state, said at least two projections being arranged so as not to overlap at all when viewed in a thickness direction of the displaying part.

20. A portable terminal unit comprising a display unit which can visually display information, said display unit comprising:

holder having opposed wall surfaces;

displaying part configured to display an image; and holding part, made of elastic material, configured to hold the displaying part in a clamped state between the opposed wall surfaces of the holder and be disposed on the holder, wherein the holding part has a first engaging portion to be engaged with a side surface of the displaying part and a second engaging portion to be engaged with a wall surface of the holder, and holds the displaying part in a clamped state between the opposed wall surfaces of the holder, and the second engaging portion of the holding part to be engaged with the wall surface is wedge-shaped.

21. A portable terminal unit comprising a display unit which can visually display information, said display unit comprising:

holder having opposed wall surfaces;

lighting part, disposed between the wall surfaces of the holder, configured to light;

displaying part configured to display an image; and holding part, made of elastic material, configured to hold the displaying part in a clamped state between the opposed wall surfaces of the holder and be disposed on the holder or the lighting part, wherein the holding part has a first engaging portion to be engaged with a side surface of the displll surface of the holder, and holds the displaying part in a clamped state between the opposed wall surfaces of the holder, and the first engaging portion of the holding part to be engaged with the displaying part has at least two projections to hold the displaying part in a clamped state, said at least two projections being arranged so as not to overlap at all when viewed in a thickness direction of the displaying part.

22. A portable terminal unit comprising a display unit which can visually display information, said display unit comprising:

holder having opposed wall surfaces;

lighting part, disposed between the wall surfaces of the holder, configured to light;

displaying part configured to display an image; and holding part, made of elastic material, configured to hold the displaying part in a clamped state between the opposed wall surfaces of the holder and be disposed on the holder or the lighting part, wherein the holding part has a first engaging portion to be engaged with a side surface of the displaying part and a second engaging portion to be engaged with a wall surface of the holder, and holds the displaying part in a clamped state between the opposed wall surfaces of the holder, and the second engaging portion of the holding part to be engaged with the wall surface is wedge-shaped.

* * * * *